US006356802B1

United States Patent
Takehara et al.

(10) Patent No.: US 6,356,802 B1
(45) Date of Patent: Mar. 12, 2002

(54) METHOD AND APPARATUS FOR LOCATING CARGO CONTAINERS

(75) Inventors: Toru Takehara, San Mateo; Thomas Ng, San Jose, both of CA (US)

(73) Assignee: Paceco Corp., Hayward, CA (US)

( * ) Notice: Subject to any disclaimer, the term of this patent is extended or adjusted under 35 U.S.C. 154(b) by 0 days.

(21) Appl. No.: 09/632,866

(22) Filed: Aug. 4, 2000

(51) Int. Cl.[7] .................................. G06F 7/00
(52) U.S. Cl. ................... 700/215; 700/225; 700/214; 235/385
(58) Field of Search ................... 700/213, 214, 700/215, 217, 225; 235/375, 385; 414/267, 288, 289, 273, 274; 340/572.1

(56) References Cited

U.S. PATENT DOCUMENTS

| | | | | |
|---|---|---|---|---|
| 4,862,160 A | * | 8/1989 | Ekchian et al. | 340/825.54 |
| 5,113,349 A | * | 5/1992 | Nakamura et al. | 364/478 |
| 5,216,618 A | * | 6/1993 | Arita et al. | 364/478 |
| 5,379,229 A | * | 1/1995 | Parsons et al. | 364/478 |
| 6,026,378 A | * | 2/2000 | Onnozaki | 705/28 |
| 6,195,006 B1 | * | 2/2001 | Bowers et al. | 340/572.1 |
| 6,230,927 B1 | * | 5/2001 | Schoonen et al. | 221/10 |

\* cited by examiner

Primary Examiner—Christopher P. Ellis
Assistant Examiner—Khoi H. Tran
(74) Attorney, Agent, or Firm—Bruce & McCoy; Ernest H. McCoy

(57) ABSTRACT

A method and apparatus for locating containers in a container storage area and identifying the containers by means of their ID tags and identifying the address of the repository location of the containers in the container storage area and wirelessly transmitting the ID and address of the containers to the container terminal management system for verification that the container is deposited at the proper repository.

8 Claims, 2 Drawing Sheets

METHOD AND APPARATUS FOR LOCATING CARGO CONTAINERS

BACKGROUND OF THE INVENTION

1. Field of the Invention

The present invention relates to a method and apparatus for identifying and determining the location or address of cargo containers which are deposited or located in a cargo container storage area.

2. Description of the Prior Art

In the present day and age, cargo containers are used almost exclusively for transporting large shipments of merchandise and goods. The containers are transported long distance by ship, rail, and truck. When they are empty, and at various times during their movement between the points of origin and destination, containers may be deposited in the storage area of a container or rail or harborside terminal. The location or address of the parked container is recorded in the container terminal management system (CTMS). Errors in the process can result in a lost container which inevitably will result in an interruption of operations and lost time when it is discovered or must be located.

Cargo containers are transported between destinations either by placing them on a trailer truck chassis, or on a flatbed rail car, or depositing them in container cells onboard a ship. The containers can be moved for relatively short distances between each of these different modes of transportation by various types of cranes which in a wharfside area include large shipboard and dockside gantry cranes and in storage areas usually include straddle carrier transporters, forklifts, toplifters, and conveyors.

At the time a truck driver, having a tractor with a container mounted on a trailer chassis, enters a storage area to leave or deposit a container therein, or when a crane or machine operator is transporting a container for deposition in the storage area, the driver or operator is assigned a parking or repository address for the container by the parking lot or storage area manager. The driver or operator is then expected to park the container at the assigned repository address.

All cargo containers are assigned an identification number which is displayed on the side and roof of the container in the form of a painted code ID tag. These are required by numerous government agencies and shipping regulators. As a result, painted ID tags comprised of numerals and letters are utilized universally and internationally.

Different transportation companies may in some cases utilize their own additional identification means. For instance, some railroad cars carry magnetic tags which, when a train carrying containers passes a magnetic code reader, allow the containers on the train to be identified in sequence. However, once a container passes the reader, it can be outbound or inbound and be moved anywhere. Thereafter, no information is obtained from the tag reading concerning the container's physical location.

The magnetic tag identification means suffers from the fact that because the tags are only installed by the individual shipping line owners at their discretion, not all transporters carry such tags. Additionally, a magnetic tag must pass in close proximity to the magnometer in order for the tag to be read. The present invention allows a mobile reader to go find any container in a storage area including those containers not associated with or carrying specialized or magnetic tag identifiers and remotely interrogate it for identification information.

A technically more sophisticated and expensive system can identify containers from a distance. However, it requires attaching a transponder tag to each container which can be interrogated by radar. Such devices can be programmed to divulge different kinds of information in the form of a coded signal when they are interrogated by a radio frequency transmitter/receiver. The disadvantage with this system is that the transponders are both expensive and somewhat delicate and subject to damage, dislocation, or disengagement as result of rough handling or severe jolting while in transit.

The addresses for identifying the repository locations for the containers in the parking lot or storage area can be of numerous forms of designation such as: painted on the pavement; identified by a monument marker; or a magnetic or transponder tag secured to the pavement. The truck driver parks the trailer chassis with the container secured thereto or the crane the operator deposits one or more containers at the assigned parking lot address. The truck driver disengages the trailer chassis from truck tractor and leaves the chassis with the container secured thereto at the assigned address. The crane operator deposits the designated containers on the assigned address and then moves the crane for pickup of the next container assigned for movement.

In the event either the truck driver or crane operator leaves the container at the wrong address, the container is thereafter lost, and the computer which keeps track of the containers which are parked in the container terminal storage area has an error in its tracking data. As a result, the lost container is effectively rendered invisible to the existing container terminal management system. Whenever and however it is discovered, lost time inevitably results.

A cargo container can become lost for several reasons such as: when a container is inadvertently placed in a different location (yard address) than the one assigned; the container ID number was incorrectly inputted to the CTMS; the container ID number is physically unreadable due to being dirty, scratched, covered, or was incorrectly labeled on the container. Any of these or other errors may result in disruptions of the inventory database. These errors become particularly serious when one attempts to place a second container into a supposedly vacant location only to find that the location is already occupied. Even more time can be lost in trying to locate a lost container. In order to prevent these time consuming interruptions, it is necessary to have a way of locating containers and continuously updating and correcting the inventory database.

There is a very large turnover of cargo containers in sea ports due to the very large volume of cargo the ports handle. It is therefore necessary to update errors in the database of the CTMS on a regular basis. The present invention allows an operator to drive down a row of parked containers and update the database in real-time, and on the fly, even during rush hour traffic in a container, rail, or harborside terminal.

Prior to the present invention, there was no known method for locating misplaced cargo containers deposited in a container terminal storage area and lost to the CTMS database except by the accidental actual discovery of a misplaced container. Randomly searching for a lost container is impractical, but sometimes necessary, requiring a great expenditure of time.

SUMMARY OF THE INVENTION

The present invention is a cargo container locating system and method for locating containers in a container storage area wherein the containers each have an identification means which can be remotely machine read and each container repository location in the storage area has an identifiable address. The container terminal has a management system containing a database of information related to container ID numbers and letters and the location of the containers in the terminal area.

The apparatus of the invention includes the transportable machine reader capable of remotely interrogating the identification means on the containers and creating a first electronic signal containing information obtained from the identification means and specific thereto which can be processed by the container terminal management system (CTMS).

A means is provided for generating a second electronic signal which identifies any particular repository address in the storage area and which also can be processed by the CTMS.

A means is provided for transporting the machine reader and the second electronic signal generator together whereby when a container identification means is interrogated, location of the container is correlated with an address in the storage area.

A means is provided for integrating the first and second electronic signals, and a further means is provided for transmitting the first and second combined identification and address electronic signals specific to the container being interrogated to a central processing computer of the CTMS for verification from the database thereof whether the container is deposited at the proper address.

The present invention also includes a method for locating cargo containers in a container terminal storage area. It comprises the steps of providing a mobile machine reader on a transporter for interrogating ID tags on cargo containers located in the storage area. The machine reader is aimed at the ID tags and captures an image thereof. A first electronic signal is created specific to the images captured by the machine reader. Concurrently, the address of the container in the storage area is identified and converted into a second electronic signal specific to the specific address. The electronic signals are then transmitted from the transporter to the CTMS and compared with the information contained in the database of the management system computer for verification of whether the container is deposited at the proper address.

OBJECTS OF THE INVENTION

It is therefore an important object of the present invention to provide a method and system for locating cargo containers in a rail or harborside terminal container storage area.

It is another object of the present invention to provide apparatus for enabling a method and system for locating misplaced or lost cargo containers.

It is a further object of the present invention to provide a method and system for collecting container ID and address information for locating errors and updating a CTMS database.

It is still another object of the present invention to provide a mobile apparatus which can traverse a container terminal storage area and remotely interrogate individual containers to determine their identity and address.

And it is yet a further object of the present invention to provide a mobile apparatus which can traverse a container terminal with a container identity interrogator and determine the address of any container deposited in the terminal to correlate that address with the container identity to verify and/or update CTMS data.

Other objects and advantages of the present invention will become apparent when the method and apparatus of the present invention are considered in conjunction with the accompanying drawings.

DESCRIPTION OF THE PREFERRED EMBODIMENT

Reference is made to the drawings for a description of the preferred embodiment of the present invention wherein like reference numbers represent like elements on corresponding views.

Figure 1:
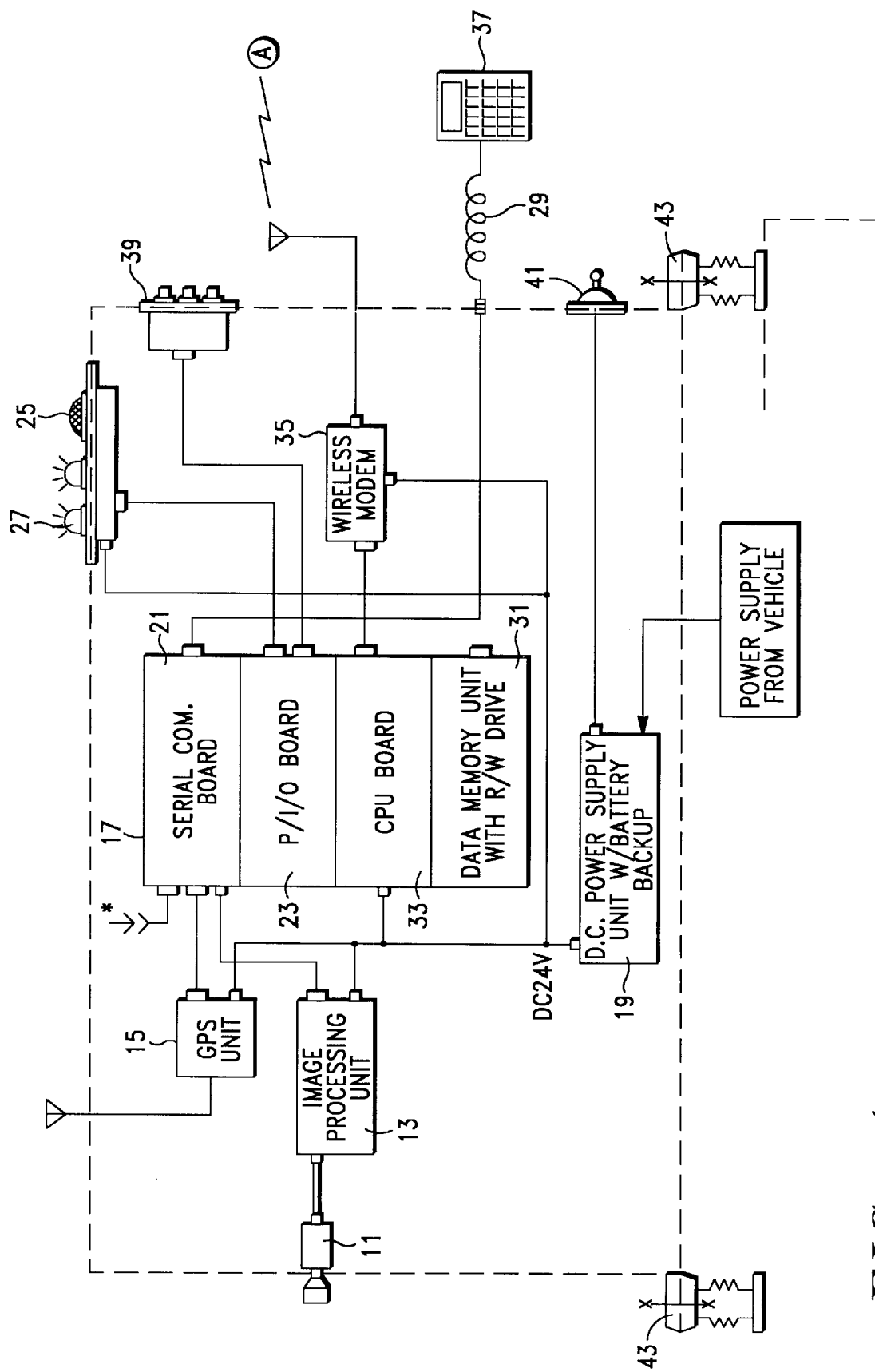
FIG. 1 is a diagram of the preferred embodiment of the apparatus utilized for implementing the method and system of the present invention.

The present invention is primarily a system and method for locating cargo containers in container, rail, or harborside terminal storage area. The apparatus which practices the present invention is comprised of off-the-shelf hardware which enables the contemplated method and system. FIG. 1 is a diagram of the various elements of apparatus which in combination comprise a preferred embodiment of the apparatus.

The method and system for locating cargo containers in container terminal storage areas can also be used for updating the container terminal management system (CTMS) database during times of heavy traffic. It can be utilized for any storage system wherein the items carry individual identification tags which can be optically machine read and in which the storage areas have individually separated but not necessarily identified repository locations or addresses.

The primary advantage of the present invention is that it can be utilized with all cargo containers presently in use. All of the other known systems for remotely identifying specific cargo containers require a supplemental identification means attached to the container. The present invention can read the standard universal identification (ID) tags that are universally and internationally utilized on the containers.

The present invention is primarily designed for locating containers in a storage area or yard wherein the containers are parked while mounted on container trailer flatbed chassis or in single stack container storage. However, it can be expanded to multiple container stacking and other storage systems, such as a geographically divided warehouse, and used in truck yards. The system can be installed on cranes to identify containers at wharfside and on straddle carrier cranes for identifying containers in single or multiple stack container storage. The system can be installed on cranes to identify containers mounted on rail cars in rail terminals or on rail cars on harborside railroad tracks.

Cargo containers are the individual property of the different shipping lines. When they are utilized by a non-owner shipping line, a rental fee is paid to the owner. At the present time, the shipping companies only know the size of each container and whether it is dry or refrigerated. Since each cargo container carries a standard serial number, the present invention can be utilized for tracking of all containers with respect to their history, damage, current location, and use.

The container locating system of the present invention is designed for containers having a standard federally required ID tag in the form of numerals and letters which can be remotely interrogated, but it can be utilized for any containers having an identification means which can be machine read. The identification means is scanned from a distance by a machine reader such as an optical character recognition (OCR) unit to interrogate the ID tag and identify the container. It is an important characteristic of the invention that an operator of the system is able to remotely interrogate an ID tag of a cargo container for its information without the necessity of physically approaching and contacting the container or even coming in close proximity thereto.

The standard ID tags identify each individual cargo container whereby a central data repository can identify that unique container and the specifics thereof so that data can be inputted to, or modified in, the data repository. The data as a minimum indicates where at any particular time a container should be located in a storage area or where it is destined if it is in transit.

An identification means reader is a tag interrogator or machine reader. The ID tag is comprised of a numerical/alphabetical character combination which can be machine read by an optical character recognition device. A camera/character reader combination can be utilized to photograph in real-time the ID tag identifier to acquire data for integration with other information acquired concurrently at the location of the cargo container.

The machine reader is transportable and capable of remotely reading the ID tags on the containers from a distance. It can be moved around the container terminal storage area on a transporter to interrogate the stored containers. The tag interrogator of the invention may necessarily be a multi-function machine capable of both optical character recognition (OCR) and remote electronic or magnetic data interpretation so that it is capable of reading any type of ID tag utilized on the containers.

An optical character recognition unit is comprised of a camera to create images of the standard ID numbers and letters located on each of the cargo containers. The camera can have automatic control of its iris and focus to accommodate both the ambient light conditions and the distance the targeted serial number is located from the camera. Usually an illumination source is provided with a camera. Generally, it includes strobe action to catch the numbers on the fly and at night in the absence of a low light camera capability.

The machine reader creates a first electronic signal containing information obtained from the identification means relating to the identity of the container which can be processed by the computers of the container terminal management system. The camera assembly of an OCR unit also includes an image processing unit to convert the camera's images into an electronic output signal in a form that the CTMS computers can recognize and correlate.

Each repository position or deposition location within a cargo container terminal storage area is provided with an address pinpointing its geographic location within the storage area. In most storage facilities, the address of each repository location is simply painted on the pavement or designated by painted lines. In more technically sophisticated facilities, a monument marker or a magnetic or transponder tag might be utilized to indicate each repository location address. The present invention is designed to identify the address of the repository location in the absence of these address identifiers. However, the location can be determined or confirmed by an operator, and inputted manually, or automatically determined electronically by a more sophisticated version of the invention.

A location determining unit (LDU) is provided by the present invention for identifying any particular container repository address and location. The address identifier might be read by a optical character reader, in which case, the same device which reads the ID tags on the containers can serve the purpose of reading the storage repository address location as well. Other means for reading the repository address may also be required depending upon the physical characteristics of the address identifier. If the address of the repository location is designated by a monument marker, comprised of a composition of radioactive elements, then a radiometer is required to read the marker. If a magnetic tag is utilized as the address identifier, then an electronic magnometer would be required to read the address contained in the tag. If a transponder is attached to the repository location, then a radio transmitter/receiver is required to interrogate the transponder.

The LDU generates a second electronic signal which is integrated with the first electronic signal created by the ID tag machine reader. The second signal identifies the repository address in the storage area. The machine reader and the LDU must necessarily integrate the signals they generate relating to the identity of the container and the address identifier into a combined signal for the CTMS computer.

In most cases, the address identifier for the repository locations in the container terminal storage areas are not adequately marked for optical character reading, radioactivity identification, or electronic/magnetic detection. In those cases, the less sophisticated version of the invention is utilized, wherein the repository addresses are inputted by the operator through a hand-held keypad. The keypad input is also necessary in the event the address identifier of the container cannot be interpreted by any means of LDU.

In a more sophisticated version of the invention, a differential global positioning system (DGPS) receiver, geographic location identifier, more usually referred to as a GPS, is utilized with the ID tag reader to supply of the address of the repository position for the required combined and integrated information input needed by the CTMS.

The machine reader, its associated apparatus, and the LDU, are carried onboard a transporter such as a cart which runs on tracks or can be steerable. The cart can either be operator driven or remotely controlled. The apparatus could be mounted onboard the storage yard patrol truck. The apparatus is capable of operating in all types of weather. The machine reader can alternatively be automatically aimed by the transporter, remotely controlled, or hand-held by an operator. The machine reader is aimed by these means to interrogate the identification means on the cargo containers.

The ID tag reader and the location determining unit (LDU) are carried by the transporter concurrently and integrated whereby when a container ID tag is recognized, the repository address of the container can be determined immediately and correlated therewith. As a result, the apparatus provides a combined ID and address for each container at a specific location in the container terminal storage area.

A means is provided for transmitting the first and second electronic signals, representing the combined ID of the container and the address of its location, to a central processing computer for verification of whether the container is deposited at the proper address. In its simplest form, the means for transmitting the information to the computer utilizes a CPU and floppy disk drive. The data/information is downloaded onto a transportable data storage unit such as a floppy disk, and hand carried to the CTMS computers.

However, the present invention contemplates wireless transmission of the data from the machine reader/transporter to the central terminal where the CTMS is located for real time data updating. This can be accomplished by a wireless modem, or a communication unit, which transmits the container's ID number and its current location back to the stationary central computer which hosts the CTMS program and also contains the inventory database.

FIG. 1 of the drawings represents the mobile unit which generates information that is transmitted back to the CTMS. The wireless transmission point is represented in FIG. 1 by the encircled letter A. The input devices include the OCR camera 11 which generates the first electronic signal in the image processing unit 13. The GPS unit 15, which is the LDU, generates the second electronic signal. Both signals are sent to the onboard computer 17. Power is supplied to the OCR, the GPS, the computer, and the signalling devices from a DC power supply unit 19 driven off of and supplied by the transporter vehicle's 24-volt DC power supply. Battery backup is supplied for protecting the computer data.

A small dedicated computer 17 is provided which is also carried onboard the transporter. It is comprised of a serial communications board 21 to interpret the signals which are inputted to it; a digital signal input/output board 23 which controls the switches, buzzers 25, lights 27, and operator input 29; a data memory unit with read/write (R/W) drive 31; and a central processing unit (CPU) board 33.

The CPU 33 functions as a traffic controller which manages the transmission of data through the wireless modem 35 which converts and transmits the signals to the CTMS computers. The CPU determines which signals are to be sent and in which order.

The serial communications board 21 receives signals from the outside units, the OCR image processing unit 13 and the LDU 15, and translates them into a form the CPU can process. The data memory unit 31, with read/write drive, stores the sensor data to floppy disks in case the modem has a problem.

If the ID tag reader and the LDU are controlled by an operator on the mobile unit transporter, the operator can be provided with a hand-held computer input module or a keypad 37. It can be utilized to input the address of the container if necessary and allows the service engineer to analyze problems. The onboard computer can also be utilized to send messages through the modem to update and change data in the database of the main computer of the CTMS and to receive and readout data therefrom.

The onboard computer terminal 17 reads data input from the OCR and LDU, and from the CTMS, to inform the operator of the status of the information, and the keypad 37 attached thereto allows input to change that data. The operator inputs the changed data when he locates a target container as well as changes to other data in the CTMS system.

The lights 27 and buzzers 25 allow the computer at the CTMS to send messages to the human operator on the equipment transporter and also allow the equipment on the transporter to communicate with the human operator. For example, the lights and buzzers can indicate malfunction in the OCR or the LDU or completion of an operation by the computer such as informing the operator that a target container has been found. Additional switches 39 allow input to the onboard computer 17 and power to the apparatus is also controlled by a switch 41 on the transporter. Shock absorbers 43 are provided on the transporter to protect the apparatus from damage due to severe jolting.

The combination of apparatus allows any mobile rover unit to read the ID number off of a container and determine the actual physical location that container. In its preferred embodiment, the present invention combines off-the-shelf versions of optical character recognition equipment and location determining units and a wireless modem. The combination allows any mobile unit to read the ID number off of the container and concurrently determine the actual physical location of that container and then wirelessly relay this combination of data to the CTMS. The off-the-shelf units can produce data output in a serial format whereby a standard unit manages the connection of the two sensor devices to feed the information to the wireless modem in the required serial format.

The method and system of the present invention also petrmit it to move the apparatus down a line of rail cars of a train and verify the positioning of the containers on the train for proper order. In addition, as mentioned earlier in the description of the prior art, the present invention allows an operator to drive along a row of parked or stacked containers and update the CTMS database in real time. If no ID data for a container being interrogated is located in the database, the ID and current address for that container is recorded in the database whereby it is updated instantly in real time.

Figure 2:
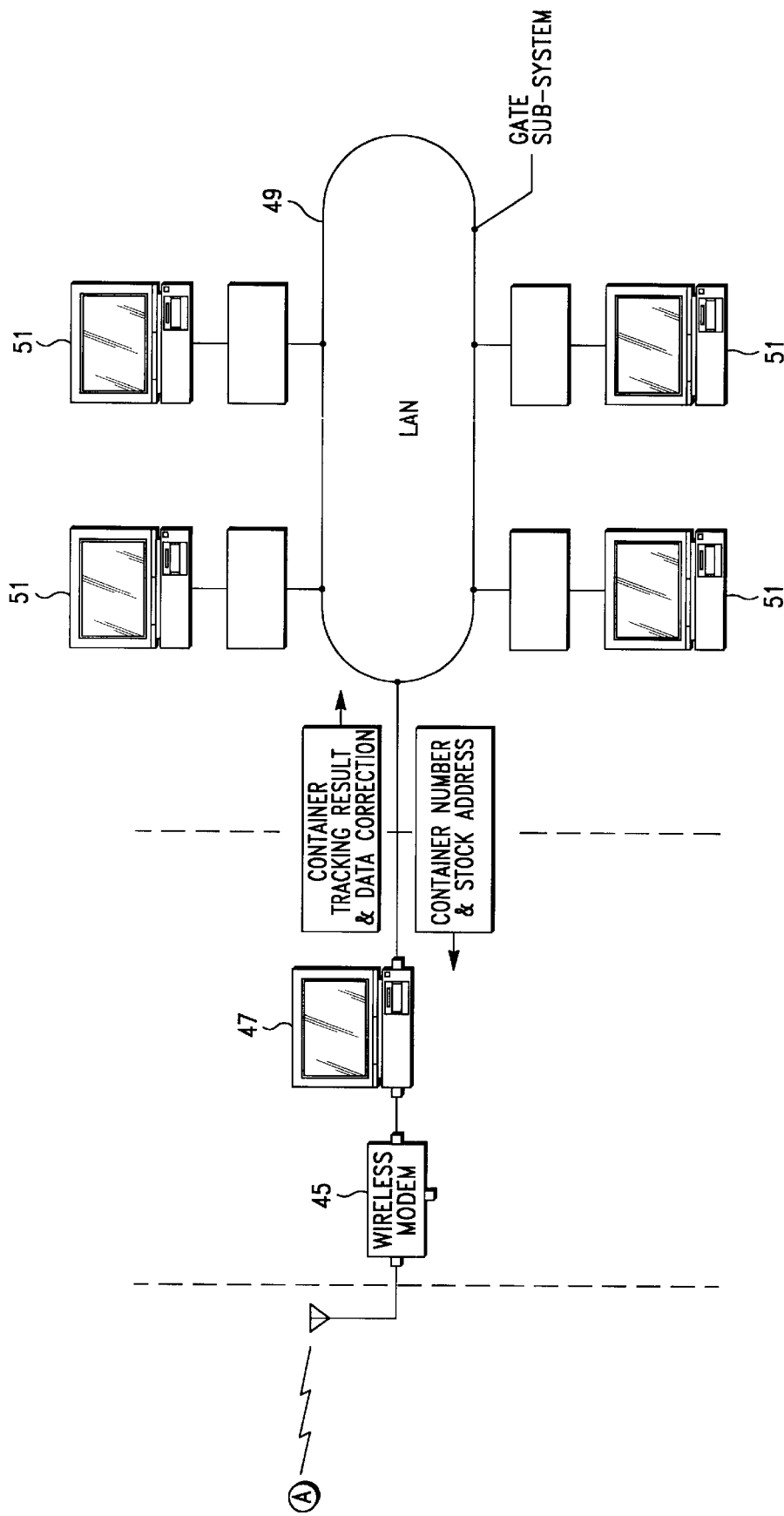
FIG. 2 is a diagram of the typical container terminal management system which utilizes the information generated by the apparatus shown in FIG. 1.

Reference is made to FIG. 2 wherein the container terminal management system (CTMS) is shown and the information reception point for the CTMS is represented therein by the encircled letter A.

A stationary wireless modem unit 45 is connected to the CTMS central computer 47. It allows the mobile unit and the central computer to exchange information. The modem receives the data transmitted by the mobile unit and the software allows the new data to update the existing CTMS database.

The LAN 49 is a local area network which is specific to the various terminal yards although it is a common mode of operation. The central computer 47 at the yard translates the signals into the reigning language at the LAN. A data subsystem reads information incoming to the system regarding the containers. Four workstation computers 51 are shown connected to the LAN.

The present invention also comprises a method for locating cargo containers in a container terminal storage area. The steps comprise: providing a mobile machine reader on a transporter for interrogating ID tags on cargo containers located in the storage area; aiming the machine reader at the ID tags and capturing an image thereof; creating a first electronic signal specific to those images; concurrently identifying the address of the container in the storage area; converting the said address into a second electronic signal; and transmitting the signals from the transporter to the CTMS and comparing the information contained in the signals to the database contained in the management system for verification from the database thereof whether the container is deposited at the proper address.

The function of the present invention is for it to reliably, under all real-life environmental conditions, read the ID numbers from a container, determine the current location of the container, then wirelessly transmit this data back to the CTMS. It must also download and save the lost container's ID number and current location to a buffer memory onboard the mobile unit. It must warn the yard clerk of the presence of target containers: one whose actual location is different from that listed in the yard's inventory database. It must also allow the yard clerk to conveniently change the CTMS inventory database.

Thus, it will be apparent from the foregoing description of the invention in its preferred form that it will fulfill all the objects and advantages attributable thereto. While it is illustrated and described in considerable detail herein, the invention is not to be limited to such details as have been set forth except as may be necessitated by the appended claims.

We claim:

1. A cargo container locating and database updating system for finding containers having an identification means which can be remotely machine read, said containers being disposed in a storage area location having an identifiable address for each container repository location in said storage area and a container terminal management system containing a database of information related to container ID numbers and letters and the location of containers in said terminal area, said system comprising a transportable identification means reader capable of remotely interrogating said identification means on said containers and creating a first electronic signal containing information obtained from said identification means and relating thereto which can be processed by said container terminal management system, means for generating a second electronic signal which identifies any particular repository address in said storage area and which can be processed by said container terminal management system, means for transporting said identification means reader and said means for generating a second electronic signal together whereby when a container identification means is interrogated the location of said container is correlated with an address in said storage area, means for integrating said first and second electronic signals, and means for transmitting said first and second combined identification and address electronic signals specific to said container being interrogated to a central processing computer of said container terminal management system for verification from said database thereof whether said container is deposited at the proper address and updating said database.

2. The cargo container locating system of claim 1 wherein said identification means reader is an optical character recognition unit.

3. The cargo container locating system of claim 1 wherein said means for generating said second electronic signal includes a location determining unit for identifying any particular container address and location in said storage area.

4. The cargo container locating system of claim 3 wherein said location determining unit is a differential global positioning system receiver.

5. The cargo container locating system of claim 1 wherein said means for transmitting said electronic signals includes a modem for wireless transmission of data to said container terminal management system.

6. A cargo container locating system for containers having standard numerical and alphabetical ID tags which can be remotely machine read, said containers being disposed in a storage area location having an identifiable address for each container repository location in said storage area and a container terminal management system containing a database of information related to the location of containers in said terminal area, said system comprising a transportable optical character recognition unit for interrogating said ID tags on said containers and creating a first electronic signal which can be processed by the container terminal management system, a transportable differential global positioning system receiver for determining the address of the repository of each of said containers deposited in said storage location area and for creating a second electronic signal which can be processed by said container terminal management system, means for integrating said first and second electronic signals, and a mobile transporter supporting said OCR unit and said GPS and said means for integrating said signals, means for wirelessly transmitting said first and second combined ID and address electronic signals of said container to a central processing computer of said container terminal management system for verification from said database thereof whether said container is deposited at the proper address.

7. A method for locating cargo containers in a container terminal storage area and updating a container terminal management system CTMS database comprising the steps of providing a mobile machine reader on a transporter for interrogating ID tags on cargo containers located in said storage area, aiming said machine reader at said ID tags and capturing an image thereof creating a first electronic signal specific to said images, concurrently identifying the address of said container in said storage area, converting said address into a second electronic signal, and transmitting said signals from said transporter to said container terminal management system and comparing the information contained in said signals to the database contained in said management system for verification from the database thereof whether said container is deposited at the proper address and updating said database.

8. The method of claim 1 wherein said signals are transmitted to said container terminal management system wirelessly.

* * * * *